United States Patent
Cho

(10) Patent No.: US 7,925,240 B2
(45) Date of Patent: Apr. 12, 2011

(54) MOBILE COMMUNICATION TERMINAL AND METHOD OF INDICATING SPEAKERPHONE MODE INFORMATION THEREOF

(75) Inventor: Young Il Cho, Seoul (KR)

(73) Assignee: LG Electronics Inc., Seoul (KR)

(*) Notice: Subject to any disclaimer, the term of this patent is extended or adjusted under 35 U.S.C. 154(b) by 644 days.

(21) Appl. No.: 11/550,950

(22) Filed: Oct. 19, 2006

(65) Prior Publication Data

US 2007/0123202 A1 May 31, 2007

(30) Foreign Application Priority Data

Oct. 19, 2005 (KR) .................. 10-2005-0098765

(51) Int. Cl.
*H04Q 7/20* (2006.01)

(52) U.S. Cl. ............................ 455/403; 455/412.1

(58) Field of Classification Search ........... 455/412.1, 455/412.2, 569.1, 403; 379/201.01, 201.04, 379/388, 390, 420.01, 420.02, 432
See application file for complete search history.

(56) References Cited

U.S. PATENT DOCUMENTS

| | | | | |
|---|---|---|---|---|
| 6,397,087 B1 * | 5/2002 | Kim et al. | .......... | 455/569.1 |
| 6,473,629 B1 * | 10/2002 | Chang | .......... | 455/566 |
| 6,611,596 B1 * | 8/2003 | Cannon et al. | .......... | 379/420.01 |
| 6,700,969 B1 * | 3/2004 | Shaffer et al. | .......... | 379/211.01 |
| 6,751,446 B1 * | 6/2004 | Kim et al. | .......... | 455/90.1 |
| 6,795,544 B1 * | 9/2004 | D'Arcy et al. | .......... | 379/219 |
| 2005/0130666 A1 * | 6/2005 | Levy et al. | .......... | 455/452.2 |
| 2006/0128443 A1 * | 6/2006 | Takayama et al. | .......... | 455/569.1 |
| 2007/0026882 A1 * | 2/2007 | Harris et al. | .......... | 455/518 |

FOREIGN PATENT DOCUMENTS

EP 1684493 A2 * 7/2006

OTHER PUBLICATIONS

U.S. Appl. No. 11/461,012 to Lee, filed Jul. 31, 2006.
U.S. Appl. No. 11/468,487 to Kim, filed Aug. 30, 2006.
U.S. Appl. No. 11/469,063 to Ahn et al., filed Aug. 31, 2006.
U.S. Appl. No. 11/548,416 to Kim, filed Oct. 11, 2006.
U.S. Appl. No. 11/550,996 to Kim, filed Oct. 19, 2006.

* cited by examiner

*Primary Examiner* — Nghi H Ly
*Assistant Examiner* — Myron Wyche
(74) *Attorney, Agent, or Firm* — KED & Associates, LLP

(57) ABSTRACT

A mobile communication terminal and method of indicating speakerphone mode thereof are disclosed, by which a far-end user can be informed whether a speakerphone mode of the mobile communication terminal is entered. The present invention includes a radio frequency part communicating with a base station, a microphone/speaker inputting a voice of a first user and outputting a voice of a second user, an input unit inputting a command for activating/deactivating a speakerphone mode and a command for making a call to the far-end user or answering a call from the far-end user, and a controller transmitting a speakerphone mode information to the base station using the radio frequency part via a reverse channel if the microphone/speaker is used according to the command for activating the speakerphone mode. Accordingly, the first user is able to inform the second user that the first user is using a speakerphone regardless of a status of the call connection, that the user is making a call or that it is before answering an incoming call.

30 Claims, 16 Drawing Sheets

FIG. 3A

| Field | Length(bits) |
|---|---|
| MORE_FIELDS | 1 |
| NUM_FIELDS | 8 |

NUM_FIELDS occurrences of the following field:

| Field | Length(bits) |
|---|---|
| CHARi | 4 or 8 |

| Field | Length(bits) |
|---|---|
| NAR_AN_CAP | 1 |
| PACA_REORIG | 1 |
| RETURN_CAUSE | 4 |
| MORE_RECORDS | 1 |
| ENCRYPTION_SUPPORTED | 0 or 4 |
| PACA_SUPPORTED | 1 |
| NUM_ALT_SO | 3 |

NUM_ALT_SO occurrences of the following field:

| Field | Length(bits) |
|---|---|
| ALT_SO | 16 |

| Field | Length(bits) |
|---|---|
| ACTIVE_PILOT_STRENGTH | 6 |
| FIRST_IS_ACTIVE | 1 |
| FIRST_IS_PTA | 1 |
| NUM_ADD_PILOTS | 3 |

NUM_ADD_PILOTS occurrences of the following record:

| Field | Length(bits) |
|---|---|
| PILOT_PN_PHASE | 15 |
| PILOT_STRENGTH | 6 |
| ACCESS_HO_EN | 1 |
| ACCESS_ATTEMPTED | 1 |

| Field | Length(bits) |
|---|---|
| RESERVED | 0-7(as needed) |

FIG. 3B

| speakerphone mode information | reserved field |
|---|---|
| speakerphone mode off | 0000 |
| speakerphone mode on | 0001 |

FIG. 4A

| Field | length(bits) |
|---|---|
| MSG_TYPE('00000001') | 8 |
| ACK_SEQ | 3 |
| MSG_SEQ | 3 |
| ACK_REQ | 1 |
| ENCRYPTION | 2 |
| ORDER | 6 |
| ADD_RECORD_LEN | 3 |
| Order-specific-fields(if used) | 8xADD_RECORD_LEN |
| RESERVED | 6 |

FIG. 4B

| speakerphone mode information | reserved field |
|---|---|
| speakerphone mode off | 000000 |
| speakerphone mode on | 000001 |

FIG. 7C

<setting of sending
the speakerphone
mode information.>
   o  no sending
   ⊙  sending once
   o  sending in succession <A setting is now
"sending once".>

Push the 2nd fct key again
if you want
"send in succession"
speakerphone
mode information.

FIG. 7D

The speakerphone mode
information will be
transmitted to the far-end
if you call to the far-end.

The speakerphone mode information is being transmitted to the far-end.

[[ring]]

010-555-5555

The speakerphone mode information is being transmitted to the far-end if you answer the calling from the far-end.

FIG. 9A

| Field | Length(bits) |
|---|---|
| MSG_TYPE('00000111') | 8 |

One or more occurrences of the following record;

| Field | Length(bits) |
|---|---|
| ACK_SEQ | 3 |
| MSG_SEQ | 3 |
| ACK_REQ | 1 |
| VALID_ACK | 1 |
| ADDR_TYPE | 3 |
| ADDR_LEN | 4 |
| ADDRESS | 8xADDR_LEN |
| ORDER | 6 |
| ADD_RECORD_LEN | 3 |
| order-specific fields(if used) | 8xADD_RECORD_LEN |

| RESERVED | 2 |
|---|---|

FIG. 9B

| reserved field | speakerphone mode information |
|---|---|
| 00 | speakerphone mode off |
| 01 | speakerphone mode on |

FIG. 10A

| Field | Length(bits) |
|---|---|
| MSG_TYPE('00000001') | 8 |
| ACK_SEQ | 3 |
| MSG_SEQ | 3 |
| ACK_REQ | 1 |
| ENCRYPTION | 2 |
| USE_TIME | 1 |
| ACTION_TIME | 6 |
| ORDER | 6 |
| ADD_RECORD_LEN | 3 |
| order-specific fields(if used) | 8xADD_RECORD_LEN |

| | |
|---|---|
| RESERVED | 7 |

FIG. 10B

| reserved field | speakerphone mode information |
|---|---|
| 0000000 | speakerphone mode off |
| 0000001 | speakerphone mode on |

MOBILE COMMUNICATION TERMINAL AND METHOD OF INDICATING SPEAKERPHONE MODE INFORMATION THEREOF

This application claims the benefit of the Korean Patent Application No. 10-2005-0098765, filed on Oct. 19, 2005, which is hereby incorporated by reference as if fully set forth herein.

BACKGROUND OF THE INVENTION

1. Field of the Invention

The present invention relates to a mobile communication terminal, and more particularly, to a mobile communication terminal and method of indicating speakerphone mode thereof. Although the present invention is suitable for a wide scope of applications, it is particularly suitable for informing a far-end user whether a calling or called party is using a speakerphone.

2. Discussion of the Related Art

Generally, a wire phone terminal or a mobile communication terminal is provided with a speakerphone mode in which a user is able to input his voice and hear a far-end user's voice without having a handset get close to a user's mouth or ear. A microphone/speaker provided within a vehicle has been recently connected to a mobile communication terminal to activate a speakerphone mode.

However, in case that a user activates a speakerphone mode, as a far-end user's voice is outputted from a loudspeaker, passengers or those around a user can hear the far-end user's voice as well as the user. Yet, the far-end user has no idea about whether the user's speakerphone is in use or whether there exist other people around the user. So, the far-end user may fail to keep secret words or make a mistake in speaking some words unpleasant to others unintentionally.

SUMMARY OF THE INVENTION

Accordingly, the present invention is directed to a mobile communication terminal and method of indicating speakerphone mode thereof that substantially obviate one or more problems due to limitations and disadvantages of the related art.

An object of the present invention is to provide a mobile communication terminal and method of indicating speakerphone mode thereof, by which a far-end user can be informed whether a speakerphone mode of the mobile communication terminal is entered.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile communication terminal according to the present invention includes a radio frequency part configured to communicate with at least one base station, a microphone/speaker configured to receive a voice of a first user and output a voice of a second user, an input unit configured to receive a mode command for activating/deactivating a speakerphone mode and a call command for making a call to the second user or answering a call from the second user, and a controller configured to transmit information related to the speakerphone mode to the at least one base station via a reverse channel.

Preferably, the mobile communication terminal further includes a microphone/speaker configured to receive the voice of the first user and outputting the voice of the second user.

Preferably, the input unit includes a first function key configured to input the mode command for activating/deactivating the speakerphone mode.

Preferably, the input unit includes a second function key configured to input a transmit command for sending the information related to the speakerphone mode.

Preferably, the mobile communication terminal further includes a memory unit configured to store information related to at least one setting for sending the information related to the speakerphone mode. The information related to the at least one setting corresponds to any one of states including 'no sending', 'sending once' and 'sending in succession'.

Preferably, the mobile communication terminal further includes the controller inquires the information related to the at least one setting if the mode command for activating the speakerphone is inputted. Moreover, the controller determines whether to send the information related to the speakerphone mode.

More preferably, the mobile communication terminal further includes a display configured to display a message, wherein if the information related to the at least one setting corresponds to the 'no sending' state, the message indicates that the information related to the speakerphone mode is not transmitted to the second user without input of the mode command.

Preferably, the reverse channel is a reverse access channel which is used to transmit a reverse access channel message and wherein the reverse access channel message carries the information related to the speakerphone mode which is included in reserved bits of an origination message of the reverse access channel message.

Preferably, the reverse channel is a reverse traffic channel which is used to transmit a reverse traffic channel message and wherein the reverse traffic channel message carries the information related to the speakerphone mode which is included in reserved bits of an order message of the reverse traffic channel message.

Preferably, the controller transmits the information related to the speakerphone mode using the radio frequency part via a reverse traffic channel if a call connection is established between the first user and the second user.

Preferably, no transmission of the information related to the speakerphone mode is made by the controller if a call connection is not established between the first user and the second user.

Preferably, the controller transmits the information related to the speakerphone mode using the radio frequency part via a reverse traffic channel or a reverse access channel if the command for making a call to the first user or answering a call from the second user is received.

In another aspect of the present invention, a mobile communication terminal includes a radio frequency part for communicating with at least one base station, an interface unit for inputting/outputting a voice from/to a hands-free microphone/speaker, an input unit for receiving a mode command for activating/deactivating a speakerphone mode and a call command for making a call to a far-end user or answering a call made from the far-end user, and a controller for transmitting information related to the speakerphone mode to the at least one base station using the radio frequency part via a reverse channel.

Preferably, the mobile communication terminal further includes a display and a detector for detecting whether the hands-free microphone/speaker is connected to the interface or not. The display is used to display a message by the controller if the detector detects that the hands-free microphone/speaker is connected and wherein the message indicates that the speakerphone mode can be activated if the command for activating the speakerphone mode is inputted.

Preferably, the input unit includes a first function key for inputting the mode command for activating/deactivating the speakerphone mode.

Preferably, the input unit includes a second function key for inputting a command for sending the information related to the speakerphone mode.

Preferably, the mobile communication terminal further includes a memory unit for storing information related to at least one setting for sending the information related to the speakerphone mode, wherein the information related to the at least one setting corresponds to any one of states including 'no sending', 'sending once' and 'sending in succession'.

Preferably, the controller inquires the information related to the at least one setting if the mode command for activating the speakerphone is inputted, and wherein the controller decides whether to send the information related to the speaker mode.

More preferably, the mobile communication terminal further includes a display for displaying a message, wherein if the information related to the at least one setting corresponds to the 'no sending' state, the message indicates that the information related to the speakerphone mode is not transmitted to the far-end user without input of the mode command.

Preferably, the reverse channel is a reverse access channel which is used to transmit a reverse access channel message and wherein the reverse access channel message carries the information related to the speakerphone mode which is included in reserved bits of an origination message of the reverse access channel message.

Preferably, the reverse channel is a reverse traffic channel which is used to transmit a reverse traffic channel message and wherein the reverse traffic channel message carries the information related to the speakerphone mode is included in reserved bits of an order message of the reverse traffic channel message.

Preferably, the controller transmits the information relate to the speakerphone mode using the radio frequency part via a reverse traffic channel if a call connection is established between calling user and the far-end user.

Preferably, no transmission of the information related to the speakerphone mode is made by the controller if a call connection is not established between a calling user and the far-end user.

Preferably, the controller transmits the information related to the speakerphone mode using the radio frequency part via a reverse traffic channel or a reverse access channel if the command for making a call to a calling user or answering a call from the far-end user is received.

Preferably, the interface is an earphone jack connectible to a connection port connectible to an earphone jack plug of the hands-free microphone/speaker provided in a vehicle.

In another aspect of the present invention, a method of indicating a speakerphone mode information in a mobile communication terminal includes receiving a mode command for activating a speakerphone mode via an input unit, and transmitting the speakerphone mode information to at least one base station via a reverse channel, wherein the speakerphone mode information is information on whether the speakerphone is activated or deactivated.

Preferably, the step of receiving includes detecting whether a hands-free microphone/speaker is connected and displaying a message indicating whether the speakerphone mode can be activated if the command for activating the speakerphone mode is inputted.

Preferably, the method further includes the step of receiving a transmit command for sending the speakerphone mode information.

Preferably, the step of receiving is executed before the steps of inquiring information related to at least one setting and displaying a message on a display if the information related to at least one setting corresponds to 'no sending' state, wherein the message indicates that the speakerphone mode information is not transmitted to a far-end user if a transmit command for sending the speakerphone mode information is not inputted.

Preferably, the step of transmitting includes checking whether a call connection is established or not and determining whether to transmit the speakerphone mode information immediately via the reverse channel based on whether the call connection is established.

More preferably, the step of determining whether to transmit the speakerphone mode information is executed before any one of transmitting the speakerphone mode information via a reverse traffic channel if the call connection is established and transmitting the speakerphone mode information via a reverse traffic channel or a reverse access channel if a command for making a call to a far-end user or answering a call from the far-end user is received.

More preferably, the speakerphone mode information is included in reserved bits of an origination message of a reverse access channel message or reserved bits of an order message of a reverse traffic channel message.

In another aspect of the present invention, a mobile communication terminal includes a radio frequency part for communicating with at least one base station, a microphone/speaker for inputting a voice of a first user and outputting a voice of a second user, an output unit for outputting an alert message, a memory for storing a mapping table, and a controller for mapping a message based on a speakerphone mode information by referring to the mapping table if the radio frequency part receives the message via a forward channel from the at least one base station, the controller outputting the alert message by means of the output unit based on the speakerphone mode information.

Preferably, the forward channel is a forward paging channel.

Preferably, the message is an order message of a forward paging channel message. And, the order message includes reserved bits.

Preferably, the forward channel is a forward traffic channel.

Preferably, the message is an order message of a forward traffic channel message. And, the order message includes reserved bits.

Preferably, the output unit includes at least one of a display, a vibration generator, a lamp and a speaker.

More preferably, the alert message is indicated by any one of a notice displayed on the display, a vibration by means of the vibration generator, an alarm indication signal indicated by the lamp and an alarm sound outputted from the speaker.

In a further aspect of the present invention, a method of indicating a speakerphone mode information in a mobile communication terminal includes receiving a message via a forward channel from at least one base station, mapping the message by the speakerphone mode information, and outputting an alert message based on the speakerphone mode information.

Preferably, the forward channel is a forward paging channel.

Preferably, the message is an order message of a forward paging channel message. And, the order message includes reserved bits.

More preferably, the step of mapping the message is carried out in a manner of mapping the message by a speakerphone activated mode if the reserved bits are set to '01' or mapping the message by a speakerphone deactivated mode if the reserved bits are set to '00'.

Preferably, the forward channel is a forward traffic channel.

Preferably, the message is an order message of a forward traffic channel message. And, the order message includes reserved bits.

More preferably, the step (b) is carried out in a manner of mapping the message by a speakerphone activated mode if the reserved bits are set to '0000001' or mapping the message by a speakerphone deactivated mode if the reserved bits are set to '0000000'.

Preferably, in the step of outputting the alert message includes outputting the alert message if the message is mapped by a speakerphone activated mode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3A is a structural diagram of a reverse access channel message;

FIG. 3B is a diagram of a mapping table indicating the relation between a reverse access channel message and speakerphone mode information;

FIG. 4A is a structural diagram of a reverse traffic channel message;

FIG. 4B is a diagram of a mapping table indicating the relation between a reverse traffic channel message and speakerphone mode information;

FIG. 9A is a structural diagram of a forward paging channel message;

FIG. 9B is a diagram of a mapping table indicating the relation between a forward paging channel message and speakerphone mode information;

FIG. 10A is a structural diagram of a forward traffic channel message;

FIG. 10B is a diagram of a mapping table indicating the relation between a reverse traffic channel message and speakerphone mode information;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

General terminologies used currently and globally are selected as terminologies used in the present invention. And, there are terminologies arbitrarily selected by the applicant for special cases, for which detailed meanings are explained in detail in the description of the preferred embodiments of the present invention. Hence, the present invention should be understood not with the names of the terminologies but with the meanings of the terminologies.

In particular, a mobile communication terminal in the description of the present invention should be understood as including a cellular phone, a PCS phone, a wire phone terminal, a PDA, a notebook computer, a desktop computer and the like.

Figure 1:
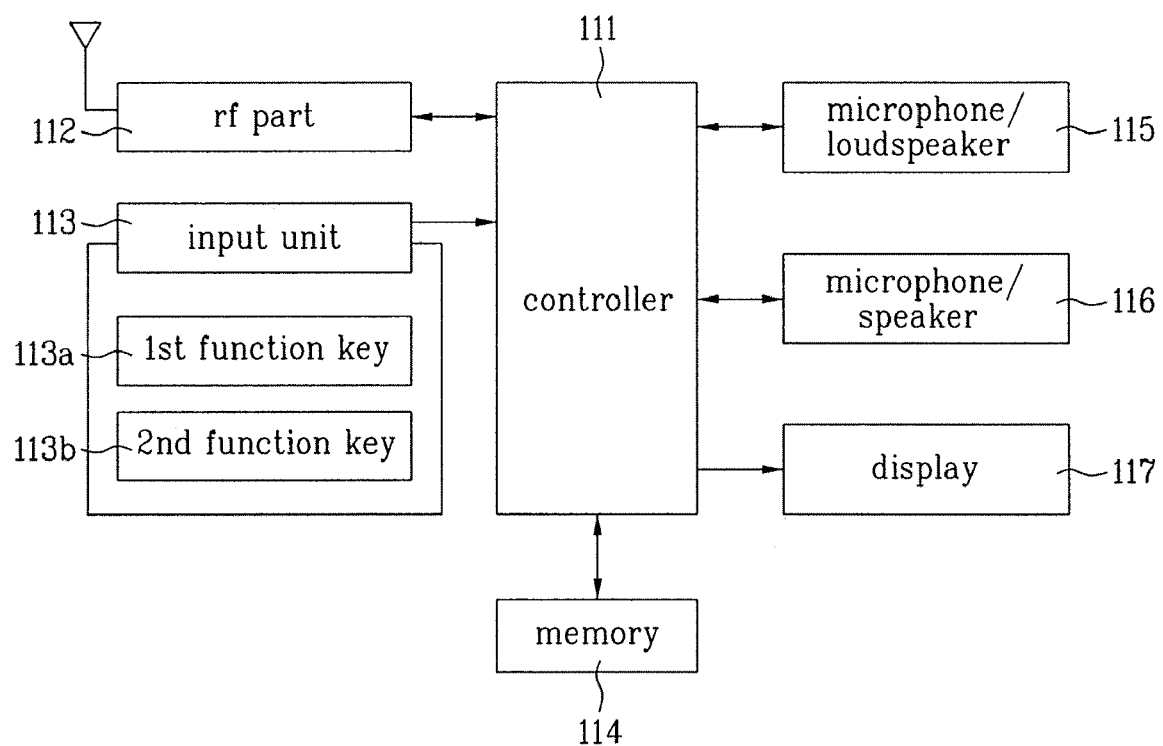
FIG. 1 is a block diagram of a mobile communication terminal of an informing side according to a first embodiment of the present invention.

FIG. 1 is a block diagram of a mobile communication terminal of an informing side according to a first embodiment of the present invention.

Referring to FIG. 1, a mobile communication terminal 110 of an informing side according to a first embodiment of the present invention includes a controller 111, a radio frequency part 112, an input unit 113, a memory 114, a microphone/speaker 115, a microphone/speaker 116 and a display 117.

The controller 111 transmits speakerphone mode information, which is information that relates to speaker phone mode, to at least one base station via a reverse channel using the radio frequency part 112 in case that the microphone/speaker 115 is available according to a command for turning on a speakerphone mode.

In this case, the speakerphone mode is the mode enabling a user to input voice or hear the voice of a far-end user without holding a handset to user's mouth or ear. In the description of one embodiment of the present invention, the speakerphone mode indicates a mode to make the microphone/speaker 115 usable.

If a mode for turning on the speakerphone mode is inputted, the controller 111 inquires setting information (setting data) and then determines whether to send speakerphone mode information. The setting can be selected by the user.

If the setting is set to 'no sending', a corresponding notice or a message is displayed via the display 117. In this case, the notice indicates that the speakerphone mode information shall not be transmitted to the far-end user unless a command for sending the speakerphone mode information is inputted.

If the setting data is not set to 'no sending', speakerphone mode information is transmitted to the base station via a reverse channel using the radio frequency part 112.

In particular, in case that a service is now connected or the users have established call connection, the controller 111 transmits speaker mode information via a reverse traffic channel using the radio frequency part 112. In case that a service is not now connected, the controller 111 does not transmit speaker mode information immediately. Instead, if a command for making a call to a far-end user or answering a call from a far-end user is inputted, the controller 111 transmits speakerphone mode information via a reverse traffic channel or a reverse access channel using the radio frequency part 112.

Meanwhile, the speakerphone mode information can be included in a reserved field of an origination message of a reverse access channel message or a reserved field of an order message of a reverse traffic channel message, which will be explained in detail later with reference to FIG. 3A, FIG. 3B. FIG. 4A and FIG. 4B.

The radio frequency part 112 is an element that performs radio communications with at least one base station.

The input unit 113 is a device to input a command for turning on/off or activating/deactivating a speakerphone mode and a command for making a call to a far-end user or answering an incoming call from a far-end user.

And, the input unit 113 includes a first function key 113a inputting the command for turning on/off the speakerphone mode and a second function key 113b inputting a command for sending speakerphone mode information. Moreover, the input unit 113 will be explained in detail with reference to FIG. 2A and FIG. 2B later.

The memory 114 is a storage device in which setting information for sending a speakerphone mode is stored. In this case, the setting information may correspond to one of 'no sending' and 'sending in succession' or one of 'no sending', 'sending once' and 'sending in succession'.

In particular, the 'no sending' is the setting for not sending speakerphone mode information to a far-end user. The 'sending once' is the setting for sending speakerphone mode information to a far-end user currently or in the future only once. After completion of executing the 'sending once', the setting information is automatically changed into 'no sending'. And, the 'sending in succession' is the setting for keeping sending speakerphone mode information to a far-end user. Besides, the setting information can be changed according to a command from the second function key 113b.

The microphone/speaker 115 is a device to input a user's voice and output a far-end user's voice loudly. If a speakerphone mode is turned on, it is able to use the microphone/speaker 115.

The microphone/speaker 116 is a device to input a user's voice and output a far-end user's voice. If a speakerphone mode is turned off, it is able to use the microphone/speaker 116. Optionally, the microphone/speaker 116 can be built in one body of the microphone/speaker 115 to enable one device to play both roles of the microphone/speaker 116 and the microphone/speaker 115.

And, the display 117 is a display device to display a notice.

Figure 2A:
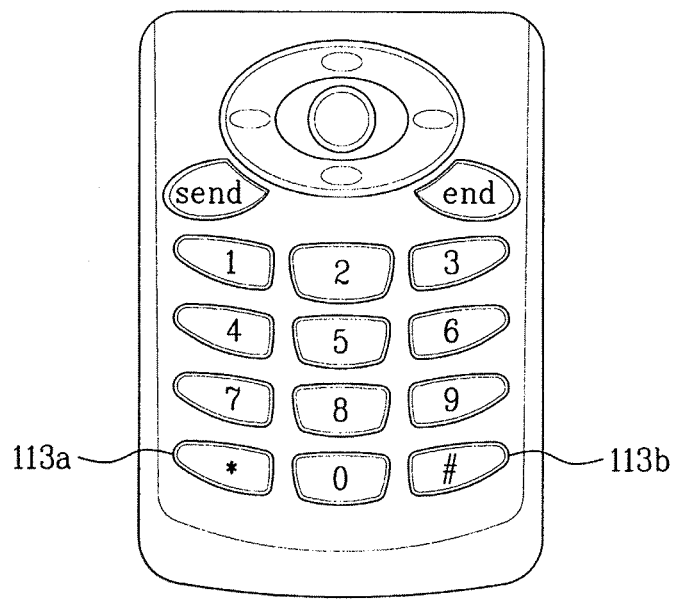
FIG. 2A and FIG. 2B are perspective diagrams of an input unit of a mobile communication terminal according to the present invention.
Figure 2B:
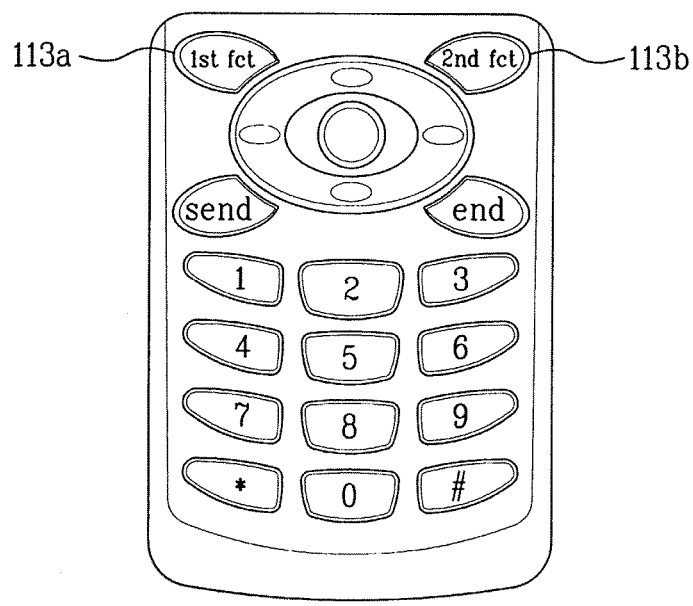

FIG. 2A and FIG. 2B are perspective diagrams of an input unit of a mobile communication terminal according to the present invention, in which an exterior of the input unit is schematically shown.

Referring to FIG. 2A and FIG. 2B, an input unit 113 includes a first function key 113a and a second function key 113b. The input unit 113 is provided with a SEND key to make or receive a call and an END key. And, the input unit 113 is generally provided with a numeral keypad.

Referring to FIG. 2A, the first function key 113a is a '*' key and the second function key 113b is a '#' key.

If the '*' key is pressed, it is able to execute an original function of the '*' key. If the '*' key is pressed for at least few seconds, it is able to execute a function of the first function key 113a. In particular, if the '*' key is pressed long enough, it is able to turn on or off a speakerphone mode.

If the '#' key is pressed, it is able to execute an original function of the '#' key. If the '#' key is pressed for at least few seconds, it is able to execute a function of the second function key 113b. In particular, if the '#' key is pressed longer, it is able to input a command for sending speakerphone mode information or a command for not sending speakerphone mode information. Namely, by inputting a command about sending speakerphone mode information, it is able to change setting information for the sending.

In case that the setting information includes 'no sending' and 'sending in succession' only, if the second function key 13b is inputted once, the setting information is changed into 'sending in succession'. If the second function key 113b is inputted once more, the setting information is changed into 'no sending'.

In case that the setting information includes 'no sending', 'sending once' and 'sending in succession', it is sequentially set to the 'no sending', 'sending once' or 'sending in succession' each time the second function key 113b is inputted once.

Referring to FIG. 2B, a first function key 113a and a second function key 113b are separately provided to an input unit 113.

If the first function key 113a is pressed or touched, it is able to turn on or off a speakerphone mode. If the second function key 113b is pressed or touched, it is able to input a command for sending speakerphone mode information or a command for not sending speakerphone mode information. Namely, if the second function key 114b is pressed or touched, it is able to change setting information for the sending of the speakerphone mode information.

FIG. 3A is a structural diagram of a reverse access channel message in part.

Referring to FIG. 3A, names and lengths of fields configuring an origination message of a reverse access channel message are shown. And, meanings and names of those fields are explained in part as follows.

First of all, MORE_FIELDS is a more dialed digits indicator and its length is 1 bit. NUM_FIELDS is a number of dialed digits in this message and its length is 8 bits. CHARi is a dialed digit or character and its length is 4 bits or 8 bits. In a most lower part of FIG. 3A, there is a field RESERVED having a length of 0 to 7 bits as needed.

And, speakerphone mode information is included in a reserved field of the origination message of the reverse access channel message.

FIG. 3B is a diagram of a mapping table indicating the relation between a reverse access channel message and speakerphone mode information.

Referring to FIG. 3B, the relation between a reserved field within a reverse access channel message and speakerphone mode information is shown. In FIG. 3B, a mapping table is shown in case that a reserved field has a length of 4 bits.

In case that a speakerphone mode is turned off, a mobile communication terminal sets all bits of a reserved field to 0 such as '0000'. In case that a speakerphone mode is turned on, a mobile communication terminal sets partial or entire bits of a reserved field to 1 such as '0001'.

FIG. 4A is a structural diagram of a reverse traffic channel message in part.

Referring to FIG. 4A, names and lengths of fields configuring an order message of a reverse traffic channel message are shown. And, meanings and names of those fields are explained in part as follows.

First of all, MSG_TYPE is a message type and its length is 8 bits. ACK_SEQ is an acknowledgement sequence number and its length is 3 bits. In a most lower part of FIG. 3B, there is a field RESERVED having a 6-bit length.

And, speakerphone mode information is included in a reserved field of the order message of the reverse traffic channel message.

FIG. 4B is a diagram of a mapping table indicating the relation between a reverse traffic channel message and speakerphone mode information.

Referring to FIG. 4B, the relation between a reserved field within a reverse traffic channel message and speakerphone mode information is shown.

In case that a speakerphone mode is turned off, a mobile communication terminal sets all bits of a reserved field to 0 such as '000000'. In case that a speakerphone mode is turned on, a mobile communication terminal sets partial or entire bits of a reserved field to 1 such as '000001'.

Figure 5:
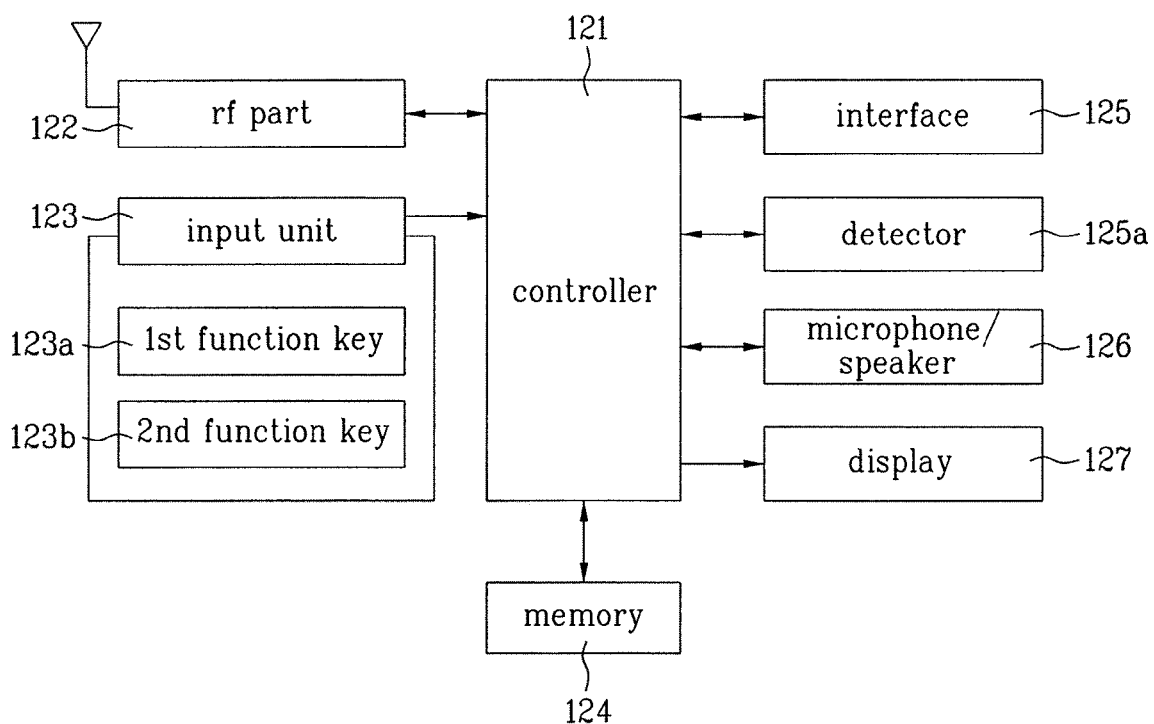
FIG. 5 is a block diagram of a mobile communication terminal of an informing side according to a second embodiment of the present invention.

FIG. 5 is a block diagram of a mobile communication terminal of an informing side according to a second embodiment of the present invention.

Referring to FIG. 5, a mobile communication terminal 120 of an informing side according to a second embodiment of the present invention includes a controller 121, a radio frequency part 122, an input unit 123, a memory 124, an interface 125, a detector 125a, a microphone/speaker 126 and a display 127.

Since the radio frequency unit 122, the input unit 123, the memory 124, the microphone/speaker 126 and the display 127 of the informing side mobile communication terminal according to the second embodiment of the present invention are almost identical to the radio frequency unit 112, the input unit 113, the memory 114, the microphone/speaker 116 and the display 117 of the informing side mobile communication terminal according to the first embodiment of the present invention, their explanations will be omitted in the following description.

The controller 121 transmits speakerphone mode information to a base station via a reverse channel using the radio frequency part 122 in case that a handsfree microphone/speaker (not shown in the drawing) is available according to a command for turning on a speakerphone mode. In this case, the handsfree microphone/speaker (not shown in the drawing) can be provided within a vehicle.

If the detector 125a detects that an external device is connected, the controller 121 displays a notice via the display 127. In this case, the notice indicates that a speakerphone mode cannot be turned on until a command for turning on the speakerphone mode is inputted.

The interface 125 to input/output a voice to/from the handsfree microphone/speaker (not shown in the drawing). And, the interface 125 may include an earphone jack connectible to an earphone jack plug of the handsfree microphone/speaker (not shown in the drawing), to which the present invention is not limited.

And, the detector 125a detects whether an external device including the handsfree microphone/speaker (not shown in the drawing) is connected to the interface 125. In this case, the external device includes such a device as a handsfree microphone/speaker, an earphone jack, a microphone and the like.

Figure 6A:
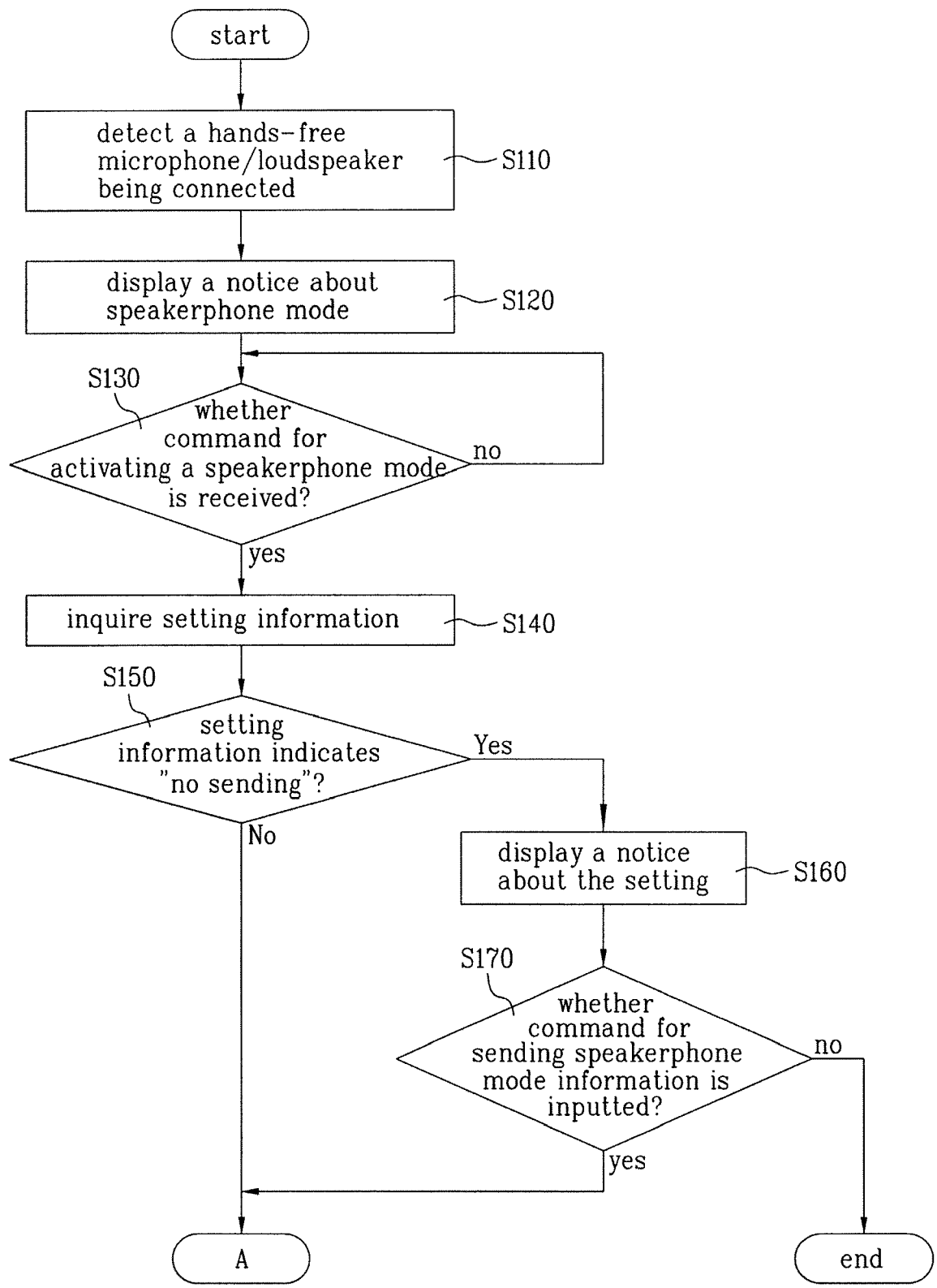
FIG. 6A and FIG. 6B are flowcharts of a method of indicating speakerphone mode information in an informing side mobile communication terminal according to the present invention.
Figure 6B:
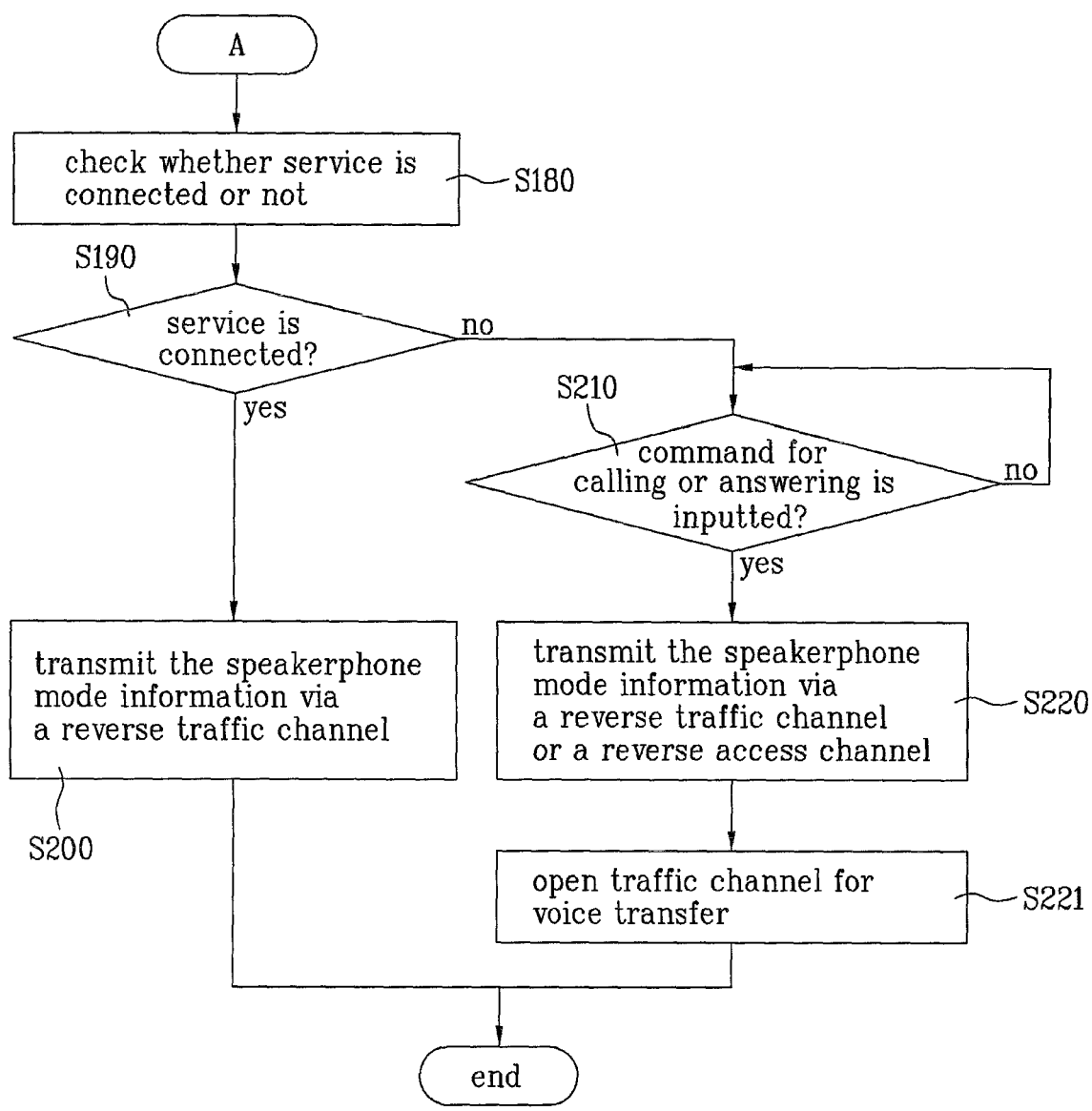

FIG. 6A and FIG. 6B are flowcharts of a method of indicating speakerphone mode information in an informing side mobile communication terminal according to the present invention, in which steps S110 and S120 are applicable to a mobile communication provided with a handsfree microphone/speaker only.

Referring to FIG. 6A and FIG. 6B, a detector of a mobile communication terminal detects that a handsfree microphone/speaker is connected (S110).

Figure 7A:
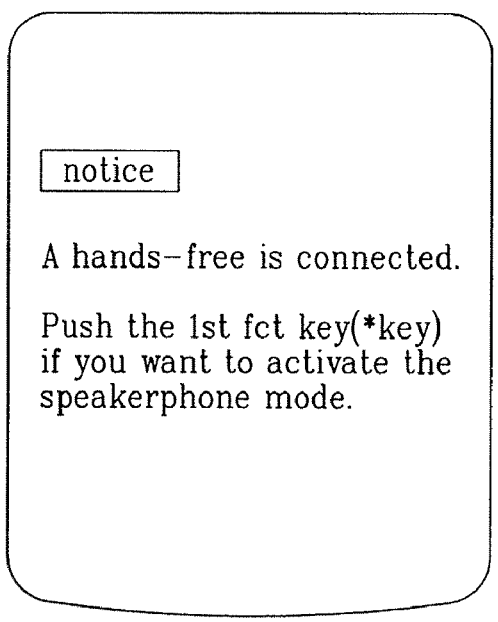
FIG. 7A and FIG. 7B are exemplary diagrams of images displayed in an informing side mobile communication terminal according to the present invention.

If so, a controller displays a notice of a speakerphone mode (S120). In this case, the notice indicates that a speakerphone mode can be turned on if a command for turning on the speakerphone mode is inputted. An example of the notice in the step (S120) is shown in FIG. 7A.

Subsequently, the mobile communication terminal stands by until a user inputs the command for turning on the speakerphone mode using a first function key or the like (S130).

Once the command for turning on the speakerphone mode is received via an input unit in the step S130, setting data is inquired (S140).

Figure 7B:
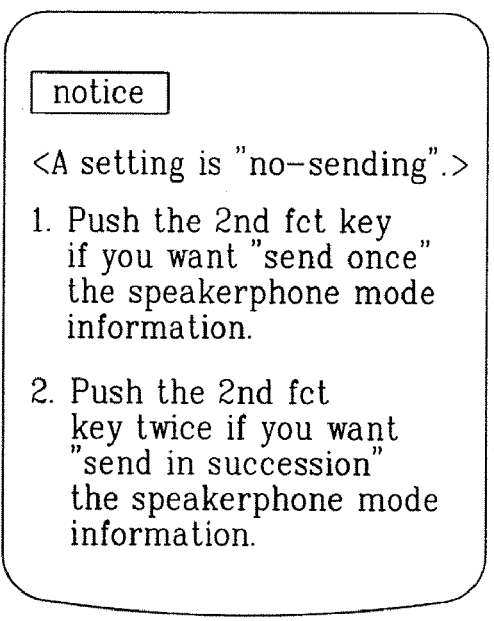

If the setting data corresponds to 'no sending' (S150), a notice of setting is displayed (S160). In this case, the notice indicates that speakerphone mode information is not transmitted to a far-end user unless a command for sending the speakerphone mode is inputted. An example of the notice in the step S160 is shown in FIG. 7B.

After having confirmed the notice, the mobile communication terminal stands by until a command of speakerphone mode sending is inputted using a second function key or the like (S170).

If the command for the sending of the speakerphone mode is not inputted in the step S170, a process of the present invention is terminated. A general process then proceeds.

If the command for the sending of the speakerphone mode is inputted in the step S170, the setting information is changed into 'sending once', or 'sending in succession' from 'no sending'. In this case, a fact that the setting information is changed is preferably displayed. An example of a screen displaying that the setting information has been changed is shown in FIG. 7C.

Subsequently, the mobile communication terminal checks whether a service is now connected or not (S180). Based on a result of the check, it is decided whether the speakerphone mode information will be immediately transmitted to a base station via a reverse channel. This is explained in detail as follows.

First of all, if the service is now connected in the step S190, the speakerphone mode information is immediately transmitted to the base station via a reverse traffic channel (S200). In case that the service is now connected, a content of transmitting the speakerphone mode information is displayed on a screen shown in FIG. 7D.

The speakerphone mode information can be included in a reverse channel message. As a result of the decision in the step S190, if the service is not now connected, the mobile communication terminal waits for a command for a future sending or a command for acknowledgement instead of transmitting the speakerphone mode information to the base station immediately.

If a command for making an outgoing call to a far-end user or a command for answering an incoming call is inputted (S210), the speakerphone mode information is transmitted to the base station via a reverse traffic channel or a reverse access channel (S220).

In this case, the reverse access channel can be used at a timing point of starting to make or answer a call (i.e., before the reverse traffic channel is opened). After the timing point, the reverse traffic channel can be used. That is, as shown in FIG. 6B, a traffic channel for voice transfer may be opened in S221.

In case of making an outgoing call to a far-end user, an exemplary content of transmitting the speakerphone mode information to the far-end user is shown in FIG. 7E. In case of answering an incoming call from a far-end user, an exemplary content of transmitting the speakerphone mode information to the far-end user is shown in FIG. 7F.

Figure 8:
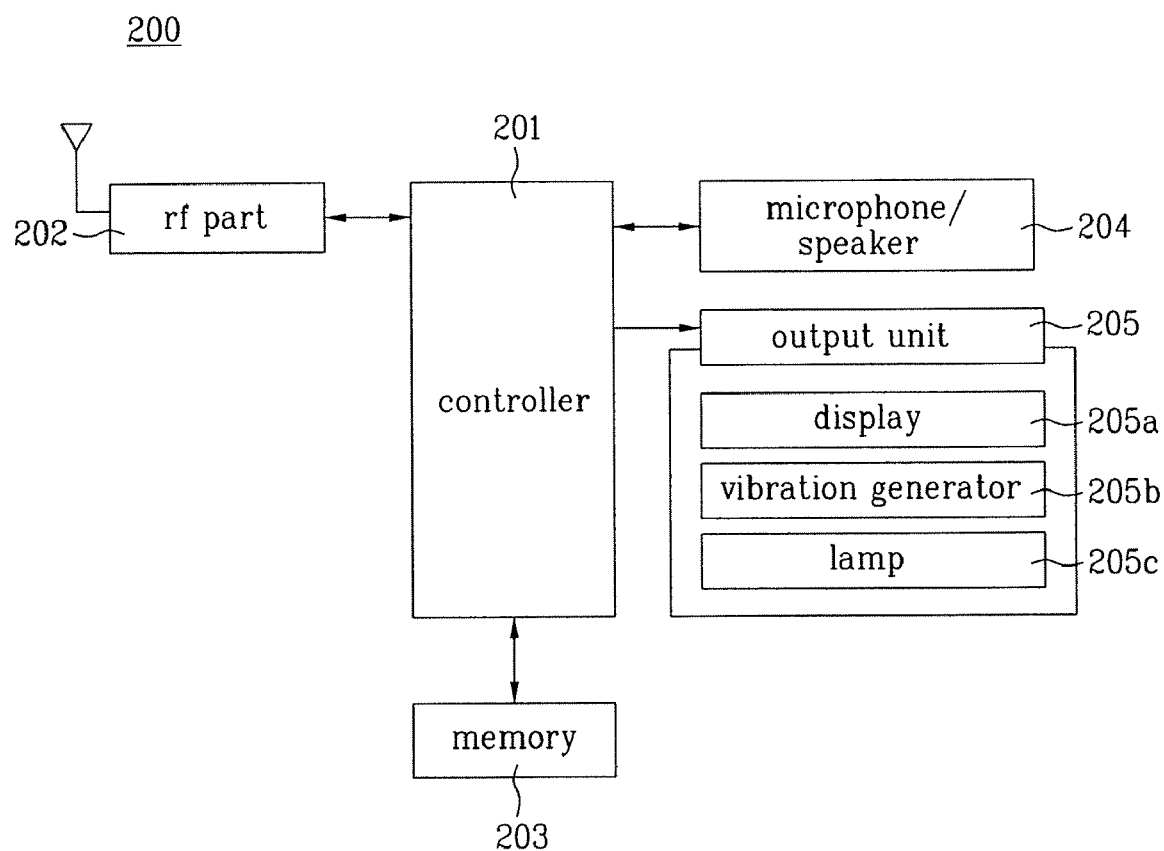
FIG. 8 is a block diagram of an informed side mobile communication terminal according to the present invention.

FIG. 8 is a block diagram of an informed side mobile communication terminal according to the present invention.

Referring to FIG. 8, an informed side mobile communication terminal 200 according to the present invention includes a controller 201, a radio frequency part 202, a memory 203, a microphone/speaker 204 and an output unit 205.

If the radio frequency part 122 receives a message via a forward channel from a base station, the controller 201 maps the received message by speakerphone mode information with reference to a mapping table and then outputs alarm via the output unit 205 based on speakerphone mode information. In this case, the forward channel can include a forward paging channel or a forward traffic channel and the message can include a forward paging channel message or a forward traffic channel message. This will be explained in detail with reference to FIG. 9A, FIG. 9B, FIG. 10A and FIG. 10B later.

The radio frequency part 202 is a means for radio-communicating with the base station.

The memory 203 is a storage means for storing the mapping table therein. And, the mapping table will be explained later with reference to FIG. 9B and FIG. 10B later.

The microphone/speaker 204 is a means for inputting user's voice and outputting far-end user's voice.

The output unit 205 is a means for outputting alarm and includes a display 205a, a vibration generator 205b and a lamp 205c. In this case, the alarm may be a notice displayed via the display 205a, a vibration generated by the vibration generator 205b, a warning signal instructed by the lamp 205c or an alarm sound outputted via a speaker.

FIG. 9A is a structural diagram of a forward paging channel message.

Referring to FIG. 9A, names and lengths of fields configuring an order message of a forward paging channel message are shown. Names and meanings of some of the fields are explained as follows.

First of all, MSG_TYPE indicates a message type and its length is 8 bits. ACK_SEQ indicates an acknowledgement sequence number and its length is 3 bits. In a most lower part of FIG. 9A, there is RESERVED having a 2-bit length.

FIG. 9B is a diagram of a mapping table indicating the relation between a forward paging channel message and speakerphone mode information.

Referring to FIG. 9B, if a reserved field is constructed with all zero, a speakerphone mode is mapped by 'on'. If a reserved field is constructed with 1 entirely or in part, a speakerphone mode is mapped by 'off'.

FIG. 10A is a structural diagram of a forward traffic channel message.

Referring to FIG. 10A, names and lengths of fields configuring an order message of a forward traffic channel message are shown. Names and meanings of some of the fields are explained as follows.

First of all, MSG_TYPE indicates a message type and its length is 8 bits. ACK_SEQ indicates an acknowledgement sequence number and its length is 3 bits. In a most lower part of FIG. 10A, there is RESERVED having a 7-bit length.

FIG. 10B is a diagram of a mapping table indicating the relation between a reverse traffic channel message and speakerphone mode information.

Referring to FIG. 10B, if a reserved field is constructed with all zero, a speakerphone mode is mapped by 'on'. If a reserved field is constructed with 1 entirely or in part, a speakerphone mode is mapped by 'off'.

Figure 11:
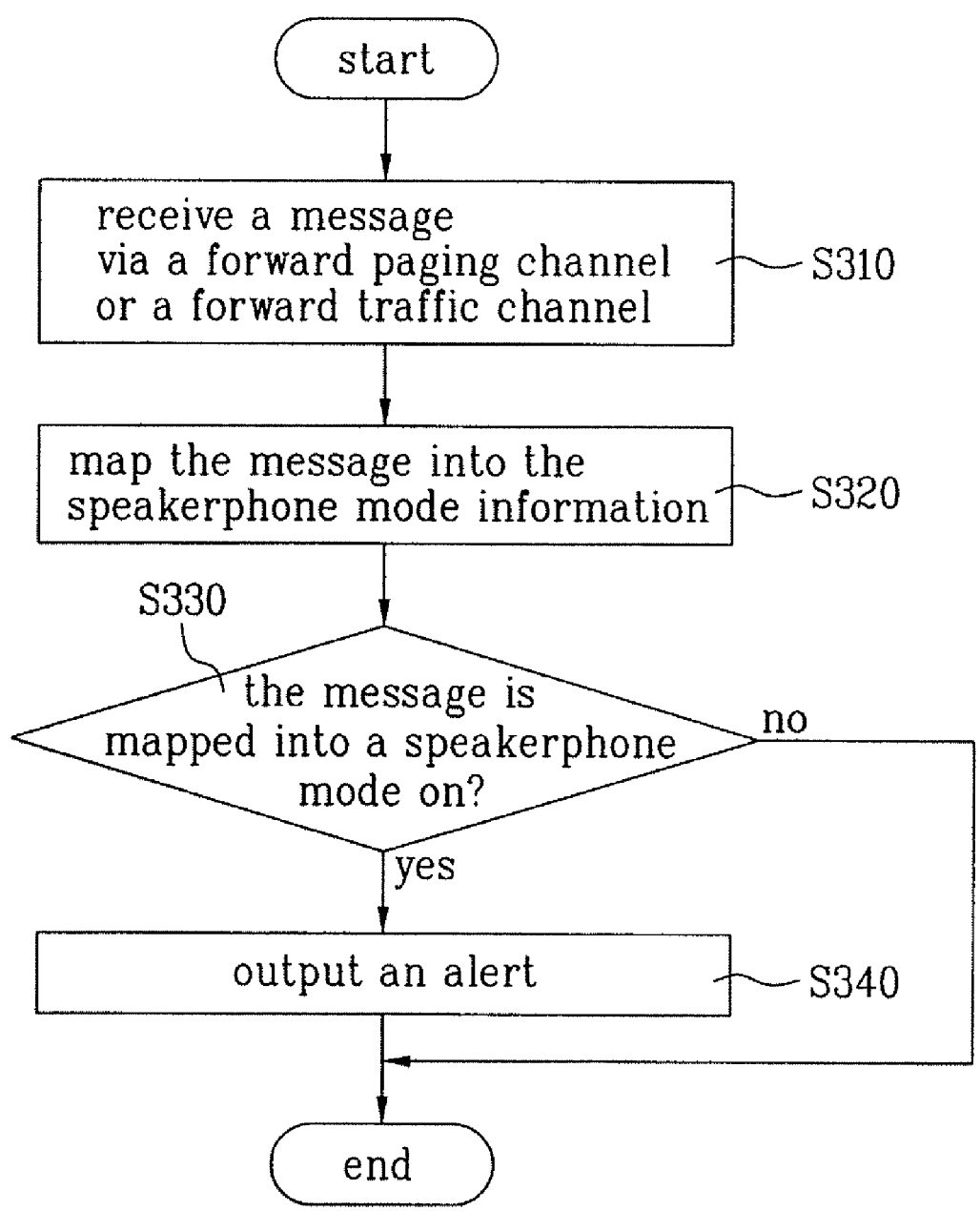
FIG. 11 is a flowchart of a method of informing an informed side mobile communication terminal of speakerphone mode information according to the present invention.

FIG. 11 is a flowchart of a method of informing an informed side mobile communication terminal of speakerphone mode information according to the present invention.

Referring to FIG. 11, an informed side mobile communication terminal receives a forward paging message or a forward traffic channel message via a forward paging or traffic channel (S310).

Subsequently, the received message is mapped by speakerphone mode information (S320).

For instance, if a reserved field of an order message of a forward paging channel message is set to '01', a speakerphone mode is mapped by 'on'. If a reserved field of an order message of a forward paging channel message is set to '00', a speakerphone mode is mapped by 'off'.

For instance, if a reserved field of an order message of a forward traffic channel message is set to '00000001', a speakerphone mode is mapped by 'on'. If a reserved field of an order message of a forward traffic channel message is set to '0000000', a speakerphone mode is mapped by 'off'.

As a result of the mapping in the step S320, if the speakerphone mode is mapped by 'off' ('no' in the step S330), a process of the present invention ends.

Otherwise, as a result of the mapping in the step S320, if the speakerphone mode is mapped by 'on' ('yes' in the step S330), alarm is outputted (S340). In this case, the alarm may be a notice displayed via a display, a vibration generated by a vibration generator, a warning signal instructed by a lamp or an alarm sound outputted via a speaker.

Figure 12A:
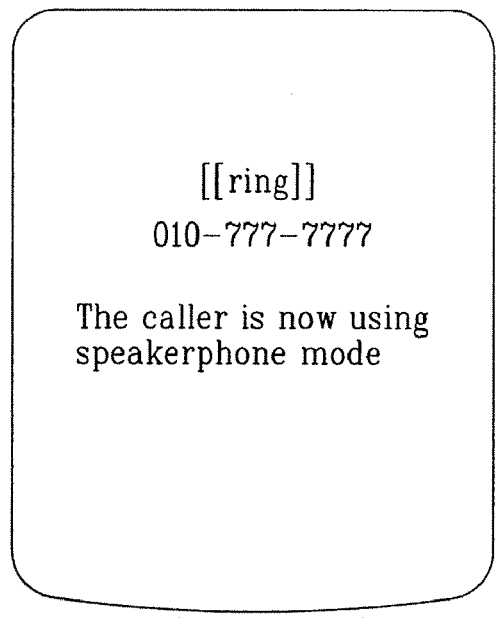
FIG. 12A and FIG. 12B are exemplary diagrams of images displayed in an informed side mobile communication terminal according to the present invention.

FIG. 12A shows an example of an image displayed in an informed side mobile communication terminal (i.e., recipient's terminal) if a caller uses a speakerphone mode.

Figure 12B:
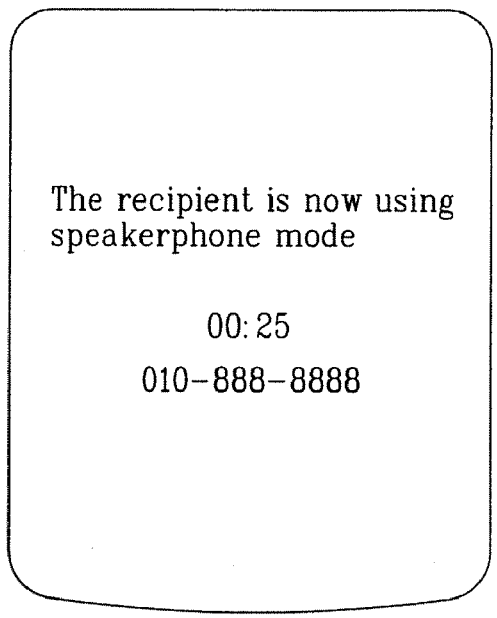

FIG. 12B shows an example of an image displayed in an informed side mobile communication terminal (i.e., caller's terminal) if a recipient uses a speakerphone mode.

Accordingly, the present invention provides the following effects or advantages.

First of all, a user is able to inform a far-end user that the user is using a speakerphone no matter what the user is a caller making a call or a recipient answering the call.

Secondly, a user is able to inform a far-end user that the user is using a speakerphone regardless of a status that a service is now connected, that the user is making a call or that it is before answering an incoming call.

Thirdly, a user is able to conveniently enter a speakerphone mode using a function key and input a command for sending speakerphone mode information conveniently using a function key.

Finally, since a far-end user understands a situation that a user is using a speakerphone, the far-end user is able to avoid revealing a secret or making a tongueslip.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile communication terminal, comprising:
a radio frequency part configured to communicate with at least one base station;
a microphone/speaker configured to receive a voice of a first user and to output a voice of a second user;
an input unit configured to receive a mode command for activating/deactivating a speakerphone mode and a call command for making a call to the second user or answering a call from the second user; and
a controller configured to transmit information related to the speakerphone mode to the at least one base station via a reverse access channel before a traffic channel for a voice transfer is opened between the mobile communication terminal and another mobile communication terminal.

2. The mobile communication terminal of claim 1, wherein the input unit comprises a first function key configured to input the mode command for activating/deactivating the speakerphone mode.

3. The mobile communication terminal of claim 2, wherein the input unit further comprises a second function key configured to input a transmit command for sending the information related to the speakerphone mode.

4. The mobile communication terminal of claim 1, further comprising a memory unit configured to store information related to at least one setting for sending the information related to the speakerphone mode, wherein the information related to the at least one setting corresponds to any one of states including 'no sending', 'sending once' and 'sending in succession'.

5. The mobile communication terminal of claim 4, wherein the controller inquires the information related to the at least one setting when the mode command for activating the speakerphone is inputted, and wherein the controller determines whether to send the information related to the speakerphone mode.

6. The mobile communication terminal of claim 4, further comprising a display configured to display a message, wherein when the information related to the at least one setting corresponds to the 'no sending' state, the displayed message indicates that the information related to the speakerphone mode is not transmitted to the second user without input of the mode command.

7. The mobile communication terminal of claim 1, wherein the reverse access channel used to transmit a reverse access channel message, and wherein the reverse access channel message carries the information related to the speakerphone mode that is included in reserved bits of an origination message of the reverse access channel message.

8. A mobile communication terminal comprising:
a radio frequency part for communicating with at least one base station;
an interface unit for inputting/outputting a voice from/to a hands-free microphone/speaker;
an input unit for receiving a mode command for activating/deactivating a speakerphone mode and for receiving a call command for making a call to a far-end user or answering a call made from the far-end user; and
a controller for transmitting information related to the speakerphone mode to the at least one base station using a radio frequency part via a reverse access channel before a traffic channel for a voice transfer is opened between the mobile communication terminal and another mobile communication terminal.

9. The mobile communication terminal of claim 8, further comprising:
a display; and
a detector for detecting whether the hands-free microphone/speaker is connected to the interface unit or not, wherein the display displays a message by the controller when the detector detects that the hands-free microphone/speaker is connected and wherein the displayed message indicates that the speakerphone mode can be activated when the mode command for activating the speakerphone mode is inputted.

10. The mobile communication terminal of claim 8, wherein the input unit comprises a first function key for inputting the mode command for activating/deactivating the speakerphone mode.

11. The mobile communication terminal of claim 10, wherein the input unit further comprises a second function key for inputting a transmit command for sending the information related to the speakerphone mode.

12. The mobile communication terminal of claim 8, further comprising a memory unit for storing information related to at least one setting for sending the information related to the speakerphone mode, wherein the information related to the at least one setting corresponds to any one of states including 'no sending', 'sending once' and 'sending in succession'.

13. The mobile communication terminal of claim 12, wherein the controller inquires the information related to the at least one setting when the mode command for activating the speakerphone is inputted, and wherein the controller decides whether to send the information related to the speakerphone mode.

14. The mobile communication terminal of claim 12, further comprising a display for displaying a message, wherein when the information related to the at least one setting corresponds to the 'no sending' state, the displayed message indicates that the information related to the speakerphone mode is not transmitted to the far-end user without input of the mode command.

15. The mobile communication terminal of claim 8, wherein the reverse access channel is used to transmit a reverse access channel message, and wherein the reverse access channel message carries the information related to the speakerphone mode that is included in reserved bits of an origination message of the reverse access channel message.

16. The mobile communication terminal of claim 8, wherein the interface unit is a connection port connectible to an earphone jack plug of the hands-free microphone/speaker provided in a vehicle.

17. A method of indicating speakerphone mode information in a mobile communication terminal, the method comprising:
receiving a mode command for activating a speakerphone mode via an input unit; and
transmitting the speakerphone mode information to at least one base station via a reverse access channel before a traffic channel for a voice transfer is opened between the mobile communication terminal and another mobile communication terminal, wherein the speakerphone mode information includes information on whether the speakerphone is activated or deactivated.

18. The method of claim 17, wherein the receiving comprises:
detecting whether a hands-free microphone/speaker is connected; and
displaying a message indicating whether the speakerphone mode can be activated when the mode command for activating the speakerphone mode is inputted.

19. The method of claim 17, further comprising receiving a transmit command for sending the speakerphone mode information.

20. The method of claim 17, wherein the receiving is executed before the following:
   inquiring information related to at least one setting; and
   displaying a message on a display when the information related to at least one setting corresponds to 'no sending' state, wherein the displayed message indicates that the speakerphone mode information is not transmitted to a far-end user when a transmit command for sending the speakerphone mode information is not inputted.

21. The method of claim 17, wherein the speakerphone mode information is included in reserved bits of an origination message of the reverse access channel message.

22. A mobile communication terminal comprising:
   a radio frequency part for communicating with at least one base station;
   a microphone/speaker for inputting a voice of a first user and for outputting a voice of a second user;
   an output unit for outputting an alert message;
   a memory for storing a mapping table; and
   a controller for mapping a received message based on a speakerphone mode information by referring to the mapping table when the radio frequency part receives the message via a forward paging channel from the at least one base station before a traffic channel for a voice transfer is opened between the first user and the second user, the controller outputting the alert message by the output unit based on the speakerphone mode information.

23. The mobile communication terminal of claim 21, wherein the message is an order message of a forward paging channel message, and wherein the order message includes reserved bits.

24. The mobile communication terminal of claim 22, wherein the output unit includes at least one of a display, a vibration generator, a lamp and a speaker.

25. The mobile communication terminal of claim 24, wherein the alert message is indicated by any one of a message displayed on the display, a vibration by the vibration generator, an alarm indication signal indicated by the lamp and an alarm sound outputted from the speaker.

26. A method of indicating speakerphone mode information in a mobile communication terminal, the method comprising:
   receiving a message via a forward paging channel from at least one base station before a traffic channel for a voice transfer is opened between a first user and a second user;
   mapping the message by the speakerphone mode information; and
   outputting an alert message based on the speakerphone mode information.

27. The method of claim 26, wherein the message is an order message of a forward paging channel message, and wherein the order message includes reserved bits.

28. The method of claim 26, wherein mapping the message is carried out in a manner of mapping the message by a speakerphone activated mode when the reserved bits are set to '01' or mapping the message by a speakerphone deactivated mode when the reserved bits are set to '00'.

29. The method of claim 26, wherein the mapping is carried out by a speakerphone activated mode when the reserved bits are set to '0000001' or mapping the message by a speakerphone deactivated mode when the reserved bits are set to '0000000'.

30. The method of claim 26, wherein outputting the alert message includes outputting the alert message when the message is mapped by a speakerphone activated mode.

* * * * *